United States Patent [19]

Groves et al.

[11] 3,855,059

[45] Dec. 17, 1974

[54] HYDRAULIC SYSTEM FOR NUCLEAR REACTORS WITH HYDRAULICALLY DRIVEN CONTROL RODS

[76] Inventors: Malcolm Duane Groves, 14 Musket Tr., Simsbury, Conn. 06070; Frank Bevilacqua, 155 Alcott Dr., Windsor, Conn. 06095; Daniel Ernest Ferris, Star Route, North Canton, Conn. 06059

[22] Filed: May 11, 1972

[21] Appl. No.: 252,435

[52] U.S. Cl................ 176/36 R, 176/19 R, 176/22
[51] Int. Cl........................... G21c 7/16, G21c 17/10
[58] Field of Search.................. 176/36, 19, 86, 22; 285/282, 298, 332; 91/47, 1; 132/606; 165/81; 137/625.64; 73/406

[56] References Cited
UNITED STATES PATENTS

| | | | |
|---|---|---|---|
| 3,535,206 | 10/1970 | Germer | 176/36 R |
| 3,533,912 | 10/1970 | Dempsey | 176/36 R |
| 3,020,888 | 2/1962 | Braun | 91/1 |
| 3,496,775 | 2/1970 | Sargent | 73/406 X |
| 3,211,473 | 10/1965 | Schmid | 285/298 X |
| 3,346,459 | 10/1967 | Prince et al. | 176/36 R |
| 1,852,279 | 4/1932 | Armacost et al. | 285/332 X |
| 3,315,702 | 4/1967 | Passaggio | 137/625.64 |
| 3,660,230 | 5/1972 | Balley, Jr. et al. | 176/36 R |

FOREIGN PATENTS OR APPLICATIONS

| | | | |
|---|---|---|---|
| 1,171,822 | 1/1959 | France | 176/36 R |

*Primary Examiner*—Benjamin R. Padgett
*Assistant Examiner*—Roger S. Galthier

[57] ABSTRACT

A hydraulic control system for hydraulically driven nuclear reactor control rods is described. Hydraulic lines from a plurality of control rods are grouped together and exit through a nozzle in the reactor vessel head. Each hydraulic line is connected to a separate valve and these valves are connected to a common return line. The common return line extends back down through the nozzle and into the reactor vessel. A plurality of these common return lines are connected to a manifold which is connected to a line which exits the reactor vessel through another nozzle in the reactor vessel head. These exit lines are connected to a lift pump which provides the differential pressure for raising the control rods. Differential pressure transducers are also included which provide a means for indicating control rod position. Disconnects are provided so that the reactor vessel head may be readily removable and so that valve and transducer coils may be readily replaced.

17 Claims, 13 Drawing Figures

HYDRAULIC SYSTEM FOR NUCLEAR REACTORS WITH HYDRAULICALLY DRIVEN CONTROL RODS

BACKGROUND OF THE INVENTION

The present invention relates to nuclear reactors and particularly to hydraulic control rod drive systems. More specifically, this invention is directed to the arrangement of hydraulic control lines and their penetration of a reactor pressure vessel as well as the hydraulic flow controls.

Nuclear reactors conventionally have a plurality of control devices or elements which are positionable within the core of the reactor. The control elements quite commonly consist of rods which are movable within tubes which extend into the core. Present commercial systems for moving these control rods consist of various types of mechanical drives. These mechanical drives may be mounted, for example, on nozzles located on the reactor vessel head. Because these drives are rather large and because only a limited number of penetrations of the vessel head can be tolerated, each drive is connected to a number of individual control rods. The rods connected to a single drive must, therefore, all be positioned the same. This type of control rod arrangement causes uneven power distribution, temperatures and fuel burnup in the core.

Proposals are now being made for the use of a large number of control rods located in a generally uniform pattern throughout the core. Each control rod has a low worth which means that each rod is less effective in its neutron absorbing capabilities than the control rods which are presently being used. These rods are only positionable at the full-in or full-out position as compared to the present control rods which are incrementally adjustable. The systems being proposed to drive these large number of low worth rods are hydraulic systems such as described in copending U.S. patent application Ser. No. 211,308 filed Dec. 23, 1971, and assigned to the assignee of the present invention. The disclosure of co-pending Application Ser. No. 211,308 is incorporated herein by reference.

Proposals are also now being made for the use of a hybrid control system, i.e., a system in which a portion of the control rods are mechanically driven and incrementally adjustable with the remainder of the control rods being hydraulically driven and positionable only at the full-out or full-in position.

A reactor with a large number of individually driven hydraulic control rods has a large number of hydraulic control lines which must be controlled. The hydraulic flow must, of course, be controllable from outside the reactor pressure vessel. Therefore, there must be some means penetrating the reactor vessel to effect this control. Due to the thickness of these vessels, the pressures involved and the quality standards for vessel penetrations as well as the necessity for accessibility to the reactor and its internals, these penetrations present a problem.

Various techniques for penetrating the reactor vessel have been disclosed in the prior art and in particular in the prior mentioned copending U.S. Patent Application Ser. No. 211,308. Although these prior art penetration techniques exhibit many advantages, they are not readily adaptable to the present reactor vessel designs.

SUMMARY OF THE INVENTION

The present invention is directed to a hydraulic control system and in particular to an improved reactor vessel penetration technique which is particularly well suited to present reactor vessel designs. In accordance with the present invention, a plurality of hydraulic control lines are grouped and penetrate the reactor vessel into a housing attached thereto. These control lines are connected to control valves, with the other sides of these control valves being connected to a single common line which is connected to the control rod lift pump via various intermediate lines and disconnects. One additional feature of the invention is that the return lines from a plurality of groups of control lines extend back down into the reactor vessel. These return lines are then grouped and attached to a single line which exits the reactor vessel and is connected to the control rod lift pump. Also, differential pressure transducers are connected across each of the control lines and the reactor vessel pressure for indicating the control rod positions. The entire arrangement is such that the various components may be readily disconnected.

The above noted and other features and advantages of the invention will be more fully understood and appreciated from the detailed description which follows.

DESCRIPTION OF THE PREFERRED EMBODIMENT

Figure 1:
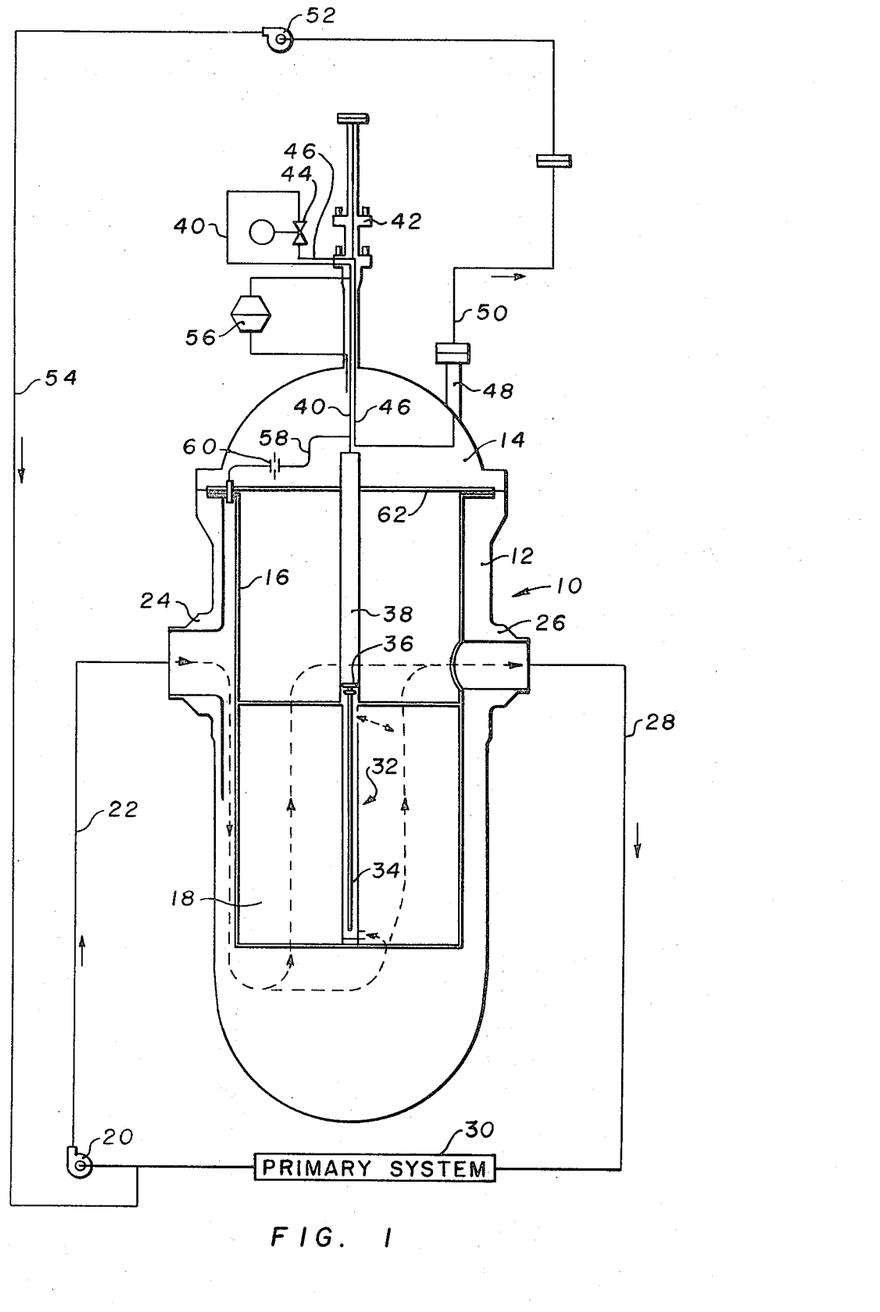
FIG. 1 is a schematic view of a nuclear reactor system incorporating the hydraulic control rod drive arrangement of the present invention.

With reference now to FIG. 1, the reactor vessel of a pressurized water reactor is indicated generally at 10 and includes a main body portion 12 and a removable head 14. Contained within the reactor vessel 10 is a core support barrel 16 which contains and supports the nuclear reactor core in the region 18. The main circulating pump 20 circulates the coolant via conduit 22 into the reactor vessel 10 through the inlet nozzle 24. The coolant flows downwardly around the outside of the core support barrel 16 and then flows upwardly through the bottom of the core support barrel and through the reactor core 18 as indicated by the dotted lines. The heated coolant then leaves the reactor vessel 10 through the discharge nozzle 26 and is conducted via conduit 28 to the primary system 30. The primary system comprises the conventional steam generators and associated equipment.

As is well known in the art, means must be provided for controlling the nuclear reaction. One of the conventional techniques for providing this control is by the use of neutron absorbing control rods which may be inserted and withdrawn from the core region. A typical control rod assembly is indicated schematically and generally at 32 and includes a control rod element 34. The control rod 34 is hydraulically driven by means of the fluid responsive actuator or piston 36 within the cylinder 38 to a fully withdrawn or a fully inserted position. For a detailed description of such a hydraulically driven control rod, reference may be had to co-pending application Ser. No. 211,308 filed Dec. 23, 1971 and assigned to the assignee of the present invention. The disclosure of co-pending application Ser. No. 211,308 is incorporated herein by reference.

The movement of the control rod 34 together with the piston 36 is controlled by the application of hydraulic forces. In the top actuated system as illustrated in FIG. 1, the control rod is lifted and withdrawn from the reactor core by reducing the hydraulic pressure in the cylinder 38 above the piston 36 and the control rod is lowered or inserted into the core by removing the reduced pressure such that gravity will cause the rod to drop. The present invention is directed to the technique for controlling these hydraulic pressures from a location outside the reactor vessel.

FIG. 1 schematically and generally illustrates the hydraulic control system of the present invention as it is applied to a single control rod. The details of the apparatus and the application of the invention to a plurality of control rods is illustrated in the other drawings and will be discussed hereinafter.

Attached to the top of the cylinder 38 is a hydraulic line 40 which extends out of the reactor vessel 10 through a nozzle in the reactor vessel head 14. This hydraulic line 40 extends up into the hydraulic control module 42 and leads to a control valve 44. For purposes of this FIG. 1 illustration, one of the valves 44 has been shown outside of the module 42 but in the actual construction, which will be described hereinafter, it is contained on the module. The other side of the control valve 44 is connected to hydraulic line or return line 46 which extends back down into the reactor vessel 10 through the nozzle. The hydraulic line 46 then leaves the reactor vessel 10 through another nozzle 48. In the actual embodiment, a plurality of hydraulic lines 46 are joined to a common line which exits through the nozzle 48. The hydraulic lines 46 are then connected via the hydraulic line 50 to the lift pump 52. The discharge from the lift pump 52 is returned to the reactor coolant circuit up-stream of the main circulating pump 20 via the conduit 54.

It is necessary that means be provided to indicate whether each control rod is in a raised or lowered position. This is accomplished in the present invention by monitoring the difference between the pressure in the cylinders 38 above the piston 36 and the pressure in the reactor vessel adjacent the reactor outlet. These pressure differences are sensed by the pressure transducer 56 which is connected across hydraulic line 40 and the top of the reactor vessel. The pressure in the top of the reactor vessel will be essentially the same as the reactor outlet pressure and these two pressures are considered to be equivalent for the purposes of the present invention. When the control rod is raised, the pressure in the hydraulic line 40 will be lower than the reactor outlet pressure. When the control rod is lowered and seated, means are provided for increasing the pressure in the cylinder 38 and the hydraulic line 40 above the reactor outlet pressure.

This is accomplished by connecting the hydraulic line 40 via conduit 58 to the pressure inside the reactor vessel exterior of the reactor core barrel. This pressure will be essentially that of the reactor coolant entering the reactor vessel and it will be higher than the pressure at the reactor outlet. In order to insure that the control rod 34 will be lifted by the lift pump 52, it is essential that the flow through conduit 58 be limited so that the lift pump 52 will reduce the pressure in the top of cylinder 38 to a sufficiently low value. This is accomplished by the orifice 60 in the conduit 58.

Figure 2:
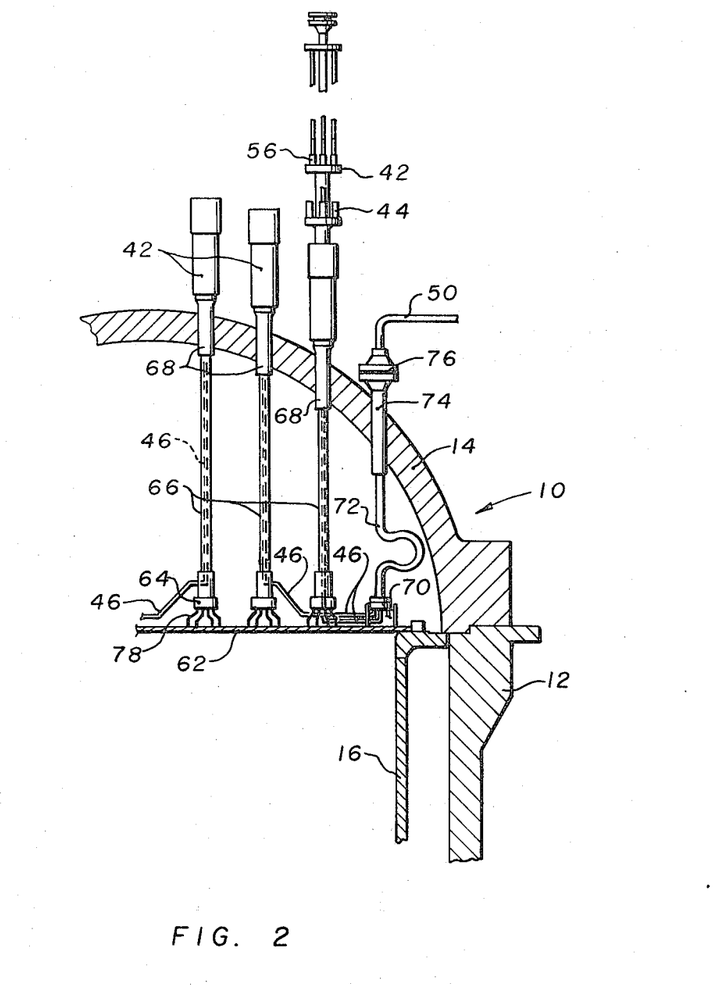
FIG. 2 is a view, partially in section, of a portion of the upper part of a nuclear reactor vessel with the hydraulic control modules mounted thereon.

Referring now to FIG. 2, there is illustrated a portion of the upper part of the reactor vessel 10 including the main body portion 12 and the removable head 14. A support plate 62 is attached to the core support barrel 16 and extends the entire cross section of the reactor vessel. Mounted on the support plate 62 are a plurality of junction blocks 64. The hydraulic lines 40 extend upwardly from these junction blocks 64 within each of the support tubes 66. The connection of these hydraulic lines 40 with the individual control rods will be described hereinafter. The support tubes 66 extend upwardly through the nozzles 68 in the reactor vessel head 14 and are connected to the hydraulic control module 42 in a manner which will also be described in detail hereinafter. These hydraulic control modules 42 contain the valves 44 and the transducers 56.

Hydraulic lines or return lines 46 then extend back down into the reactor vessel 10 through the nozzles 68 and the support tubes 66 and into the junction blocks 64. The return lines 46 from a plurality of junction blocks 64 are then connected to a manifold 70 which connects the return lines 46 into a single exit conduit 72. As illustrated this exit conduit 72 has a loop therein to compensate for differential expansion. The exit conduit 72 leaves the reactor vessel through the nozzle 74 and is connected to the hydraulic line 50 by means of the disconnect 76. A typical embodiment of the present invention will have a plurality of exit conduits 72 as well as the associated manifolds 70 and nozzles 74.

Figure 3:
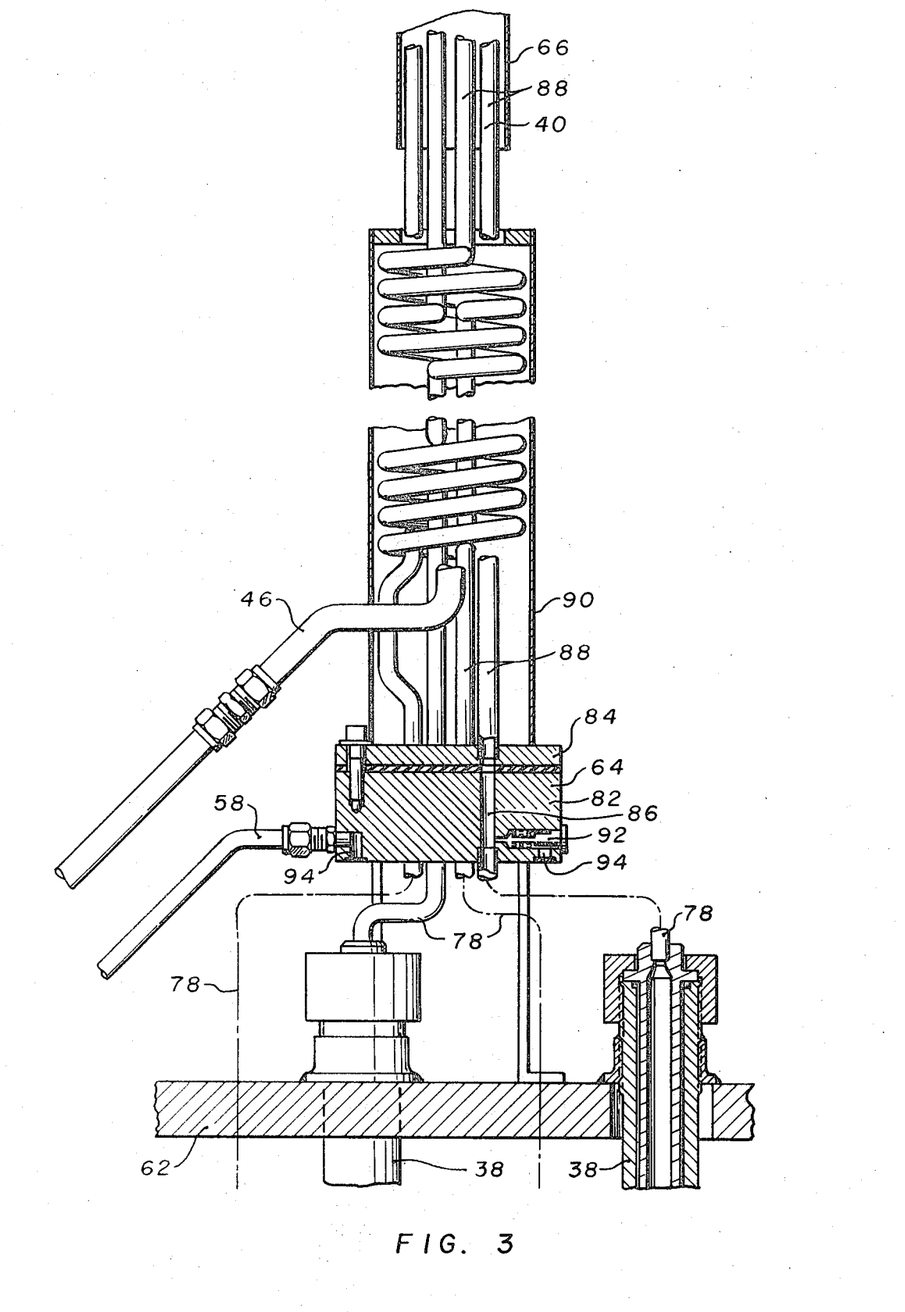
FIG. 3 is a detailed view partially in cross section illustrating the attachment of the hydraulic control lines to the control rods.

FIG. 3 illustrates in detail the connection of the hydraulic lines 40 to the individual control rods. The cylinders 38 for each of the individual control rods are attached to the support plate 62. Attached to the top of each of these cylinders 38 are the hydraulic lines 78. A plurality of these hydraulic lines 78 are then attached to the junction blocks 64 which include a main portion 82 and a removable portion 84. The channels 86 connect the hydraulic lines 78 with the hydraulic lines 88. These hydraulic lines 88 are all contained within a sleeve 90 and are coiled as illustrated. These coils are for the purpose of compensating for any differential movement between the junction block 64 and the upper connection of the tubes 88. The hydraulic lines 78 and 88 and the channels 86 form the hydraulic line 40 of FIG. 1.

Each of the channels 86 in the junction blocks 64 are connected via individual orificing means 92 to the annular chamber 94. This annular chamber 94 is then connected at one location to the conduit 58 which is connected to a high pressure source as illustrated in FIG. 1. This provides the high pressure for monitoring control rod positions as discussed earlier. The return line 46 is also illustrated in FIG. 3.

Figure 4:
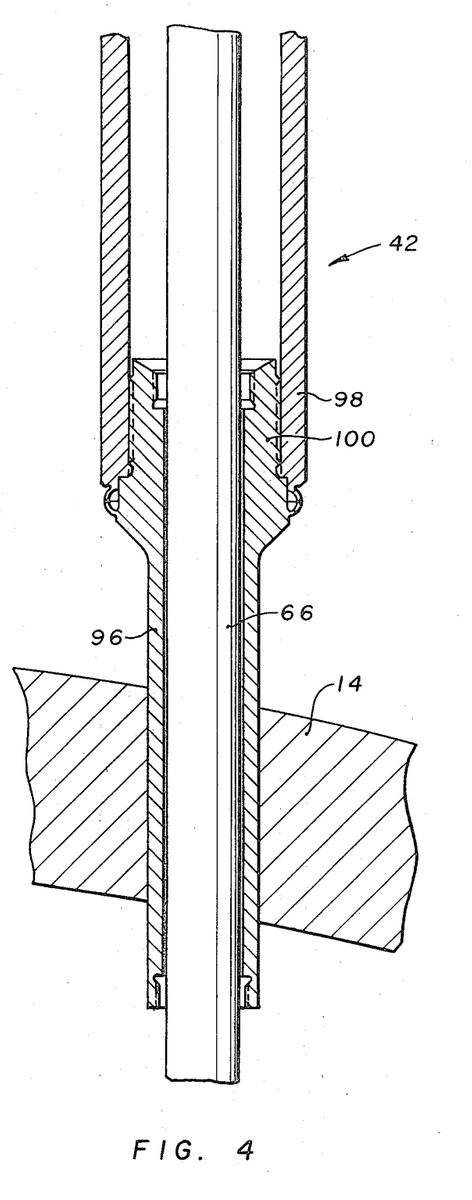
FIG. 4 is a detailed view partially in cross section illustrating the penetration of the reactor vessel by the hydraulic control system.

FIG. 4 is a continuation of the upper portion of FIG. 3 and illustrates the penetration of the reactor vessel head 14 by the support tube 66 which contains the hydraulic lines 88 and the return line 46. A nozzle 96 extends through an opening in the reactor vessel head 14 and is attached thereto such as by welding. Attached to the upper end of the nozzle 96 is the lower portion 98 of the hydraulic control module 42. The lower portion 98 of the hydraulic control module 42 is threaded to the nozzle 96 at 100 so that it may be removed therefrom.

Figure 5:
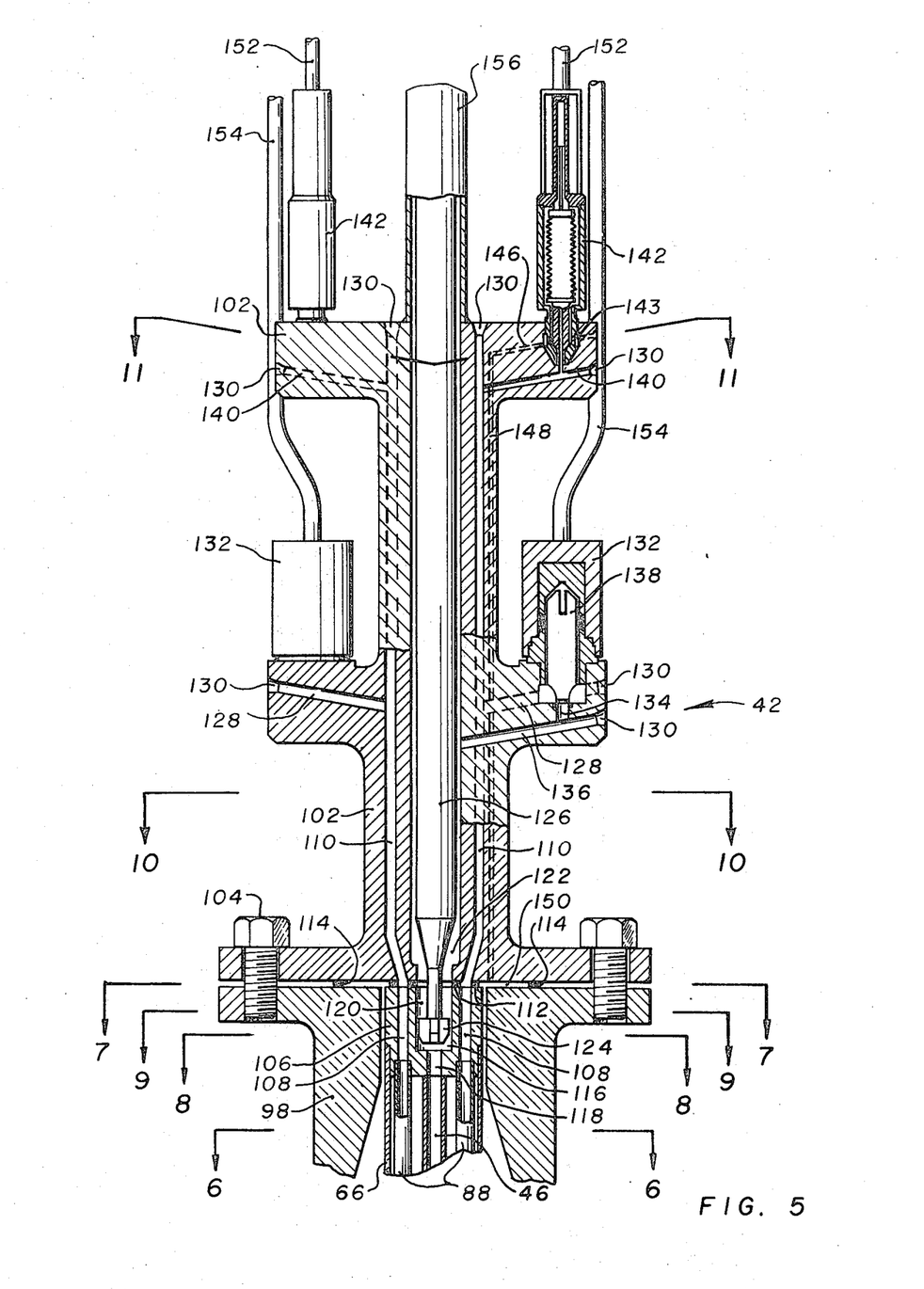
FIG. 5 is a detailed view in cross section illustrating the main body portion of the hydraulic control module.
Figure 6:
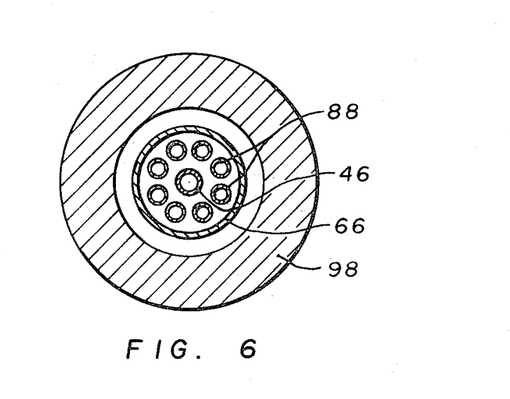
FIGS. 6, 7, 8, 9, 10 and 11 are cross section views of FIG. 5 taken at the correspondingly numbered section lines.

FIG. 5 illustrates the continuation of the top of FIG. 4 and shows the main body portion 102 of the hydraulic control module 42 attached to the lower portion 98 by means of the bolts 104. The support tube 66 is attached at its upper end to the terminal block 106 such as by welding. It is noted that this terminal block 106 is the same diameter as the support tube 66 which facilitates removal of the reactor vessel head 14 as will be described hereinafter. The hydraulic lines 88 are also attached at their upper ends to the terminal block 106. The terminal block 106 contains channels 108 which correspond in number to the number of hydraulic lines 88. The hydraulic lines 88 are attached to the terminal block 106 so that they communicate with their respective channels 108. FIG. 6 is a cross section taken along line 6—6 of FIG. 5 and shows the arrangement of the hydraulic lines 88 and the return line 46 within the support tube 66.

Figure 7:
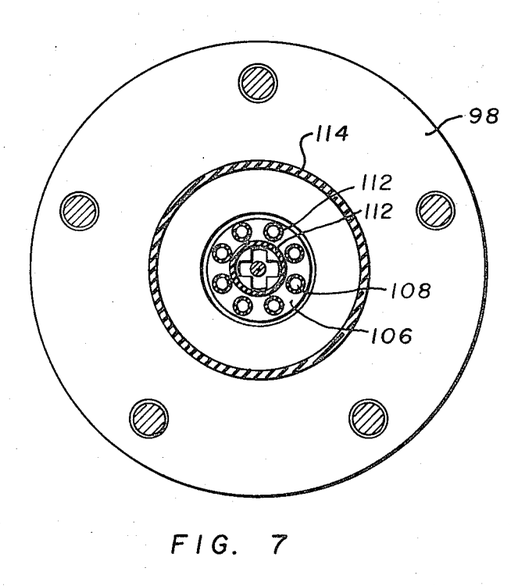

The main body portion 102 of the hydraulic control module 42 contains channels 110 which are located so as to communicate with the channels 108 in the terminal block 106. Located between the lower portion 98 and the main body portion 102 are sealing means which take the form of gaskets 112 and 114. FIG. 7 is a cross section view taken along line 7—7 of FIG. 5 and shows the arrangement of the gaskets 112 and 114. It can be seen that the gaskets 112 are actually a plurality of gaskets around each of the joints between channels 108 and 110 and around the center portion of the terminal block so that each of the channels are separated from each other.

Figure 8:
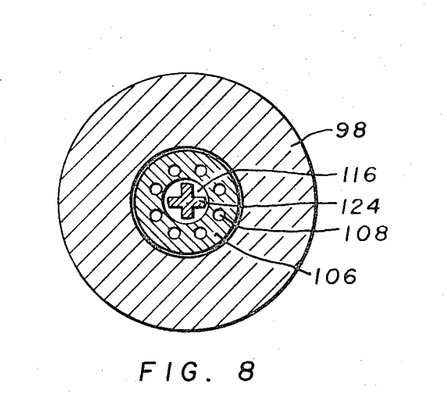
Figure 9:
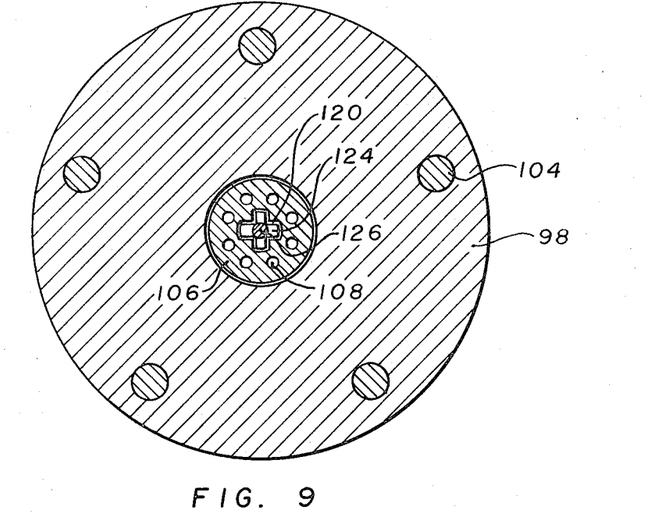

Contained within the terminal block 106 is a cylindrical cutout or chamber 116 which is shown in FIGS. 5 and 8. Extending downwardly from this cylindrical cutout 116 is a channel 118 which communicates with the return line 46 which is attached and sealed to the terminal block 106 such as by welding. Extending upwardly from the cylindrical cutout 116 is a cruciform shaped cutout 120 as shown in FIG. 9 which is a cross section taken along line 9—9 of FIG. 5. This cruciform shaped cutout 120 provides communication between the cylindrical cutout 116 and the central channel 122 of the main body portion 102. Also, this cruciform shaped cutout 120 forms a part of the means for drawing the terminal block 106 and the main body portion 102 together so as to compress and seal the gaskets 112. The central gasket 112 forms a seal around cutout 120 in terminal block 106 and central channel 122 in the main body portion 102. This sealing operation is performed by inserting the cruciform shaped member 124 down through the cruciform cutout 120 into the cylindrical cutout 116. The cruciform shaped member 124 is then rotated approximately 45° by means of the rod 126 which is attached thereto. The rod 126 is then pulled upwardly by means which will be described hereinafter which will cause the cruciform shaped member 124 to pull upwardly on the upper surface of the cyclindrical cutout 116 and force the terminal block 106 upwardly across the gaskets 112.

Figure 10:
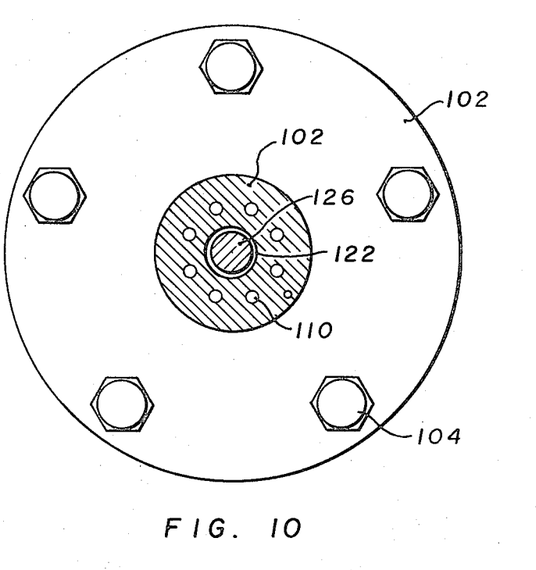

The channels 110 in the main body portion 102 of the hydraulic control module 42 extend upwardly and each one communicates with an intersectioning channel 128. These channels 128 are formed by drilling holes in the main body portion 102 and then sealing the open ends of the holes such as by plug welding as indicated at 130. These channels 128 communicate with one side of the solenoid valves 132 which are mounted in the main body portion 102. The other side of the solenoid valves 132 communicate with the channels 134 and 136. When the solenoid valves are actuated, the armature 138 moves upwardly so as to provide communication between the channels 128 and 134. When the solenoid valves are not actuated, the armature 138 is in the position as shown in FIG. 5 which closes off the channel 134. The channels 136 from each of the solenoid valves 132, which are also drilled in the main body portion 102 and sealed at 130, communicate with the central channel 122. Therefore, all of the channels 134 and 136 from the solenoid valves 132 are connected via the central channels 122, the cruciform cutout 120, the cylindrical cutout 116 and the channel 118 with the common return line 46. As shown in FIG. 10, which is a cross section taken along line 10—10 of FIG. 5, the actual communication between the channels 136 and the terminal block 106 is the annular space in the central channel 122 around the rod 126.

Figures 11, 13:
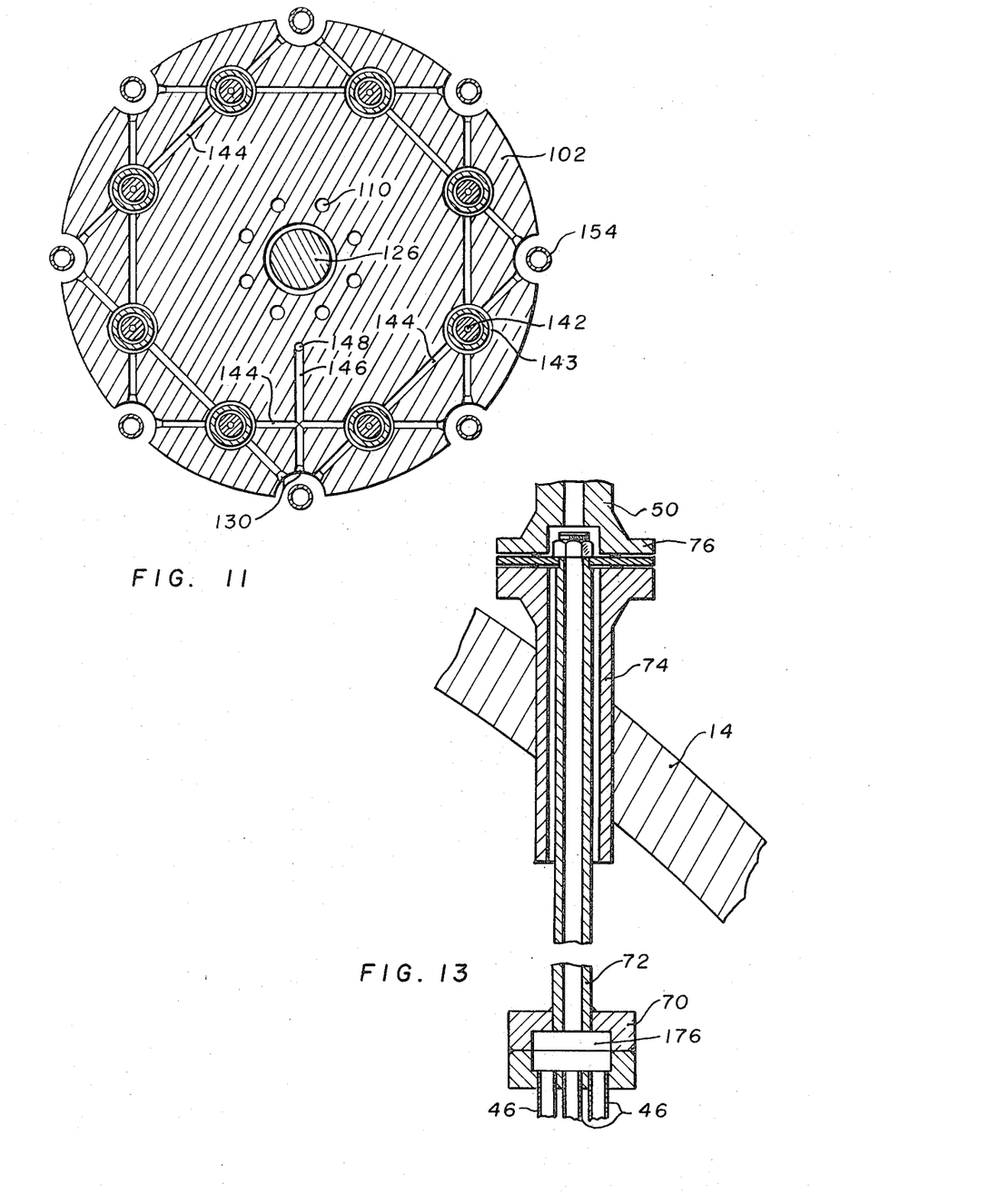
FIG. 13 is a detailed view in cross section illustrating the exit of the hydraulic lines from the reactor vessel.

The channels 110 in the main body portion 102 extend upwardly past the channels 128 to the top of the main body portion 102. These channels 110 are drilled into the main body portion 102 and sealed at 130. Intersecting with the channels 110 and extending outwardly therefrom are the channels 140 which are likewise drilled into the main body portion 102 and sealed at 130. These channels 140 communicate with the transducers 142. The second sides of the transducers 142 communicate with the annular spaces 143 surrounding each of the transducers. Channels 144 connect these annular spaces 143 together as shown in FIG. 11 which is a cross section taken along line 11—11 of FIG. 5. At one point, a channel 144 is connected by a channel 146 to the channel 148. This channel 148 extends downwardly through the main body portion 102 and communicates with the space 150 between the main body portion 102 and the lower body portion 98 between the gaskets 112 and 114. This space 150 communicates with the annular space within the lower body portion 98 around the support tube 66 which in turn connects with the pressure in the reactor vessel via the annular space between the nozzle 96 and the support tube 66. It can thus be seen that each transducer will respond to the difference in pressure between its respective channel 140 and the pressure in the reactor vessel. This pressure difference will be negative when the control rods are in the withdrawn position and positive when the control rods are inserted into the reactor core.

Figure 12:
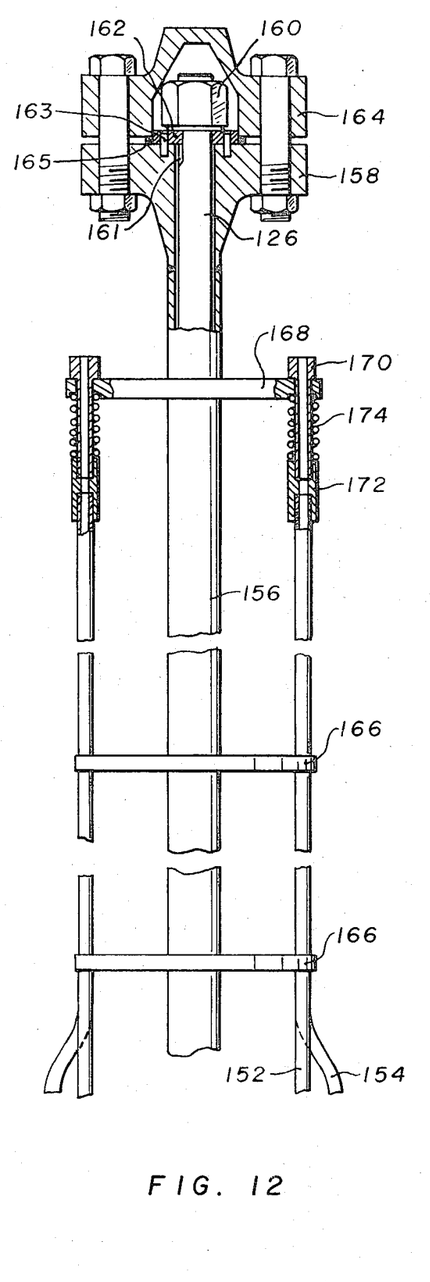
FIG. 12 is a detailed view partially in cross section of the uppermost portion of the hydraulic control module.

The electrical leads from the transducers 142 are contained within the tube 152 while the electrical leads for the solenoids 132 are contained within the tubes 154. The tubes 152 and 154 extend upwardly from the transducers and solenoids as shown in FIG. 12 to a point significantly above the reactor vessel. Also, a tube 156 is attached to the top of the main body portion 102. The rod 126 extends upwardly through this tube 156 as shown in FIG. 12. Attached to the top of the tube 156 is the flange portion 158. A nut 160 is threaded to the top of rod 126 whereby the tightening of the nut will draw rod 126 upwardly with respect to the tube 156 and the main body portion 102 which will in turn draw the terminal block 106 upwardly against the gaskets 112 between the terminal block and the main body portion. The rod 126 has a slot 161 cut therein. Located between the nut 160 and the flange 158 is a washer 162 which has a key portion extending into the slot 161. The washer 162 is pinned to the flange 158 between pins 163. The pins 163 prevent rotation of the washer 162 with respect to the flange 158 and the key on the washer 162 prevents rotation of the rod 126 with respect to the washer. This arrangement prevents rotation of the rod 126 when the nut 160 is being tightened. In order to rotate the rod 126, the nut 160 and the washer 162 are removed. Attached to the flange 158 is a sealing cap 164 which, by means of the gaskets 165 between the flange 158 and the sealing cap 164, will seal the module 42 to prevent leakage of reactor coolant.

The tubes 152 and 154 carrying the electrical connections, extend upwardly and are supported by means of the brackets 166 and are attached to the upper bracket 168. The attachment to the upper bracket 168 is accomplished by means of the bolts 170 which are threaded to the sleeves 172. The sleeves 172 slip down over the tops of the tubes 152 and 154 and are maintained in position by means of springs 174 located between the sleeves and the upper bracket 168. The sleeves 172 and the bolts 170 contain holes for the electrical connections. By merely pulling up on the bolts 170, the sleeves will be raised against the spring force so as to release the upper ends of the tubes 152 and 154. The individual tubes 152 and 154 can then be pulled up which will remove the solenoid coils and the transducer coils from their respective assemblies so they can be replaced if defective.

When it is necessary to remove the reactor vessel head 14, the sealing caps 164 are removed from the hydraulic control modules 42. The nut 160 and the washer 162 are removed and the rod 126 rotated so that the cruciform shaped member 124 can be removed from the terminal block 106. The reactor vessel head 14 can then be lifted. The nozzles 96 will merely slip over the support tube 66 and the terminal block 106.

Referring now to FIG. 13, there is illustrated in more detail the arrangement of the manifold 70 and the exit conduit 72. The manifold 70 consists of two portions which are welded together with a plurality of the return lines 46 attached thereto in communication with the chamber 176. The single exit conduit 72 also communicates with the chamber 176. The exit conduit 72 with a loop therein as illustrated in FIG. 2 then exits the reactor vessel through the nozzle 74 in the reactor vessel head 14. The exit conduit 72 is then connected to the hydraulic line 50 by means of the disconnect 76 which incorporates seals to seal the reactor vessel pressure from the atmosphere and to seal the pressure in the conduit 72 and 50 from the atmosphere and from the reactor vessel pressure.

In certain situations it might be desirable to have several of the hydraulically driven control rods operated in conjunction with each other. This can be accomplished by joining the several control rods to a single control valve 44 such as by placing cross channels between the appropriate channels 110 or 128 or by otherwise connecting together the appropriate hydraulic lines 40 somewhere throughout their length.

The return lines 46 have been illustrated as extending back down into the reactor vessel and being manifolded and joined to exit lines 72. Although this is the preferred arrangement, an alternate arrangement is for a hydraulic line to be connected to the module 42 in communication with the channels 136. This hydraulic line extends upwardly from the main body portion 102 of the module 42 and leads directly (through the necessary disconnects) to the lift pump. However, this is a less desirable arrangement since the space above the reactor vessel would be more inaccessible due to the maze of hydraulic lines. Also, the hydraulic lines would be more exposed and subject to damage. A further disadvantage of this alternate arrangement is that radioactive water would be carried to a higher level within the reactor containment building. This would tend to increase the radiation level to which the operating personnel are subjected. In the preferred embodiment, only a limited number of hydraulic lines 50 must be disconnected to remove the reactor vessel head. Also, since there are only a limited number of the hydraulic lines 50 and since they are arranged around the periphery of the reactor vessel head and maintained at a low level within the containment building, they are less subject to damage, the radioactive water is kept at a lower level and radioactive shielding can be readily provided.

Although a preferred embodiment of the invention has been shown and described and alternate embodiments have been disclosed, it will be understood that these embodiments are illustrative and that changes may be made without departing from the scope of the invention as claimed.

What is claimed is:

1. In a nuclear reactor including fissionable fuel elements, neutron absorber elements movable with respect to said fuel elements and fluid responsive actuators for positioning said absorber elements, said fuel elements, absorber elements and actuators all being positioned within reactor vessel having a main portion and a removable head, the improvement comprisng:
    a. housing means attached to the exterior of said reactor vessel;
    b. aperture means in said reactor vessel providing communication between the inside of said housing means and the inside of said reactor vessel;
    c. a plurality of valves attached to said housing means;
    d. a first plurality of conduit means commensurate in number with said plurality of valves each of said conduit means connecting one of said valves to at least one of said actuators and comprising:

i. a first conduit having a first and second end, the first end of said first conduit connected to at least one of said actuators, said first conduit extending through said aperture means into said housing means; and ii. means in said housing means connecting the second end of said first conduit to one side of said one valve;

e. a common conduit means connected to the other side of said plurality of valves;

f. means for applying fluid lift forces; and g. means connecting said common conduit means to said means for applying fluid lift forces.

2. The apparatus of claim 1 wherein said common conduit means comprises:

a. a return conduit extending from inside said housing into said reactor vessel;

b. means connecting said other side of said plurality of valves to one end of said return conduit;

c. manifold means located inside said reactor vessel, the other end of said return conduit being connected to said manifold means; and d. a line leading from said manifold means through said reactor vessel to said means for applying fluid lift forces.

3. The apparatus of claim 2 and further including pressure transducer means connected across each of said first plurality of conduit means and the interior of said reactor vessel whereby each of said transducer means has the differential pressure between the first conduit means to which it is connected and the pressure in said reactor vessel applied thereto.

4. The apparatus of claim 3 wherein said reactor vessel contains an inlet region and an outlet region and wherein said pressure transducer means are connected with the interior of said reactor vessel in said outlet region.

5. The apparatus of claim 4 and further including means connecting each of said first conduits to a pressure source higher than the pressure in said outlet region.

6. The apparatus of claim 5 wherein said higher pressure source comprises said fluid inlet region.

7. The apparatus of claim 6 wherein each of said means connecting each of said first conduits to said fluid inlet region includes orifices to restrict the flow of fluid therethrough.

8. The apparatus of claim 1 wherein said plurality of first conduits each include means for accommodating changes in the distance between said coupled first ends and said second ends of said first conduits.

9. The apparatus of claim 8 wherein said means for accommodating changes in distance comprise coils in each of said first conduits.

10. The apparatus of claim 2 and further including a mounting device attached to said housing means, said valves being attached to said mounting device and said means connecting said second ends of said first conduits to one side of said valves includes channels in said mounting devices.

11. The apparatus of claim 10 wherein said second ends of said first conduits terminate at and are attached to a terminal block, said terminal block including channels therethrough, said terminal block channels comprising a part of said means connecting said second ends of said first conduits to one side of respective valves and communicating with respective ones of said first conduits and said channels in said mounting device.

12. The apparatus of claim 11 and further including sealing means surrounding each of said channels between said mounting device and said terminal block.

13. The apparatus of claim 12 and further including a means for drawing said mounting device and said terminal block together whereby said sealing means is sealed.

14. The apparatus of claim 13 wherein said means for drawing said mounting device and said terminal block together comprises a tube attached to and extending longitudinally from said mounting device, an elongated member extending longitudinally through said tube, means associated with said rod adapted to engaged said terminal block and draw said terminal block toward said mounting device.

15. The apparatus of claim 14 wherein said mounting device has a longitudinal aperture therethrough and wherein said means for drawing said mounting device and said terminal block together extends through said aperture, said aperture comprising at least a portion of said means connecting said other side of said plurality of valves to one end of said return conduit.

16. The apparatus of claim 15 wherein said terminal block includes a further channel therethrough, said further channel comprising a portion of said means connecting said other side of said plurality of valves to one end of said return conduit.

17. The apparatus of claim 16 wherein said further channel and said longitudinal aperture are in communication and further including sealing means between said mounting device and said terminal block surrounding said aperture and said further channel.

* * * * *